United States Patent Office 3,704,161
Patented Nov. 28, 1972

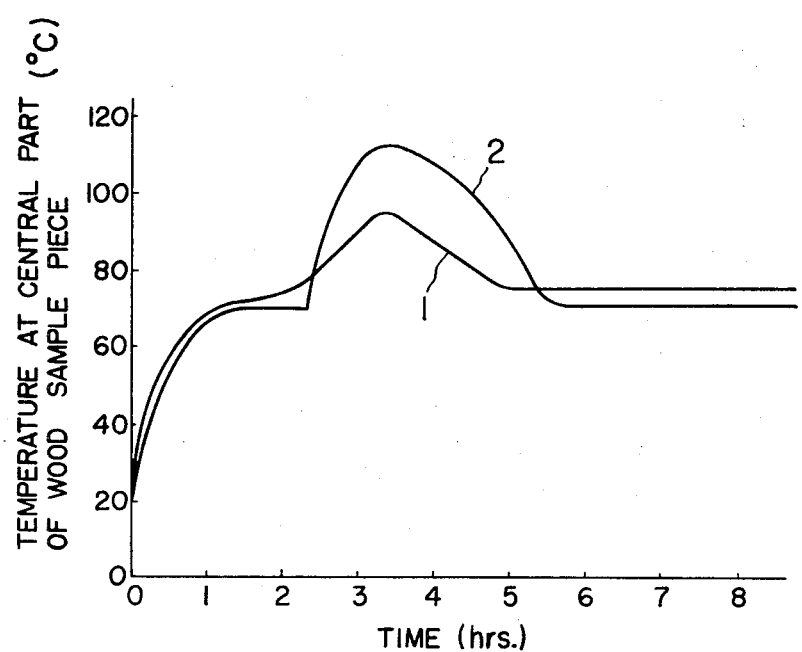

---

3,704,161
PRODUCTION OF WOOD-PLASTICS COMPOSITE STRUCTURES
Yasuju Yamaguchi and Yujiro Nakayama, Yokkaichi, Japan, assignors to Mitsubishi Petrochemical Company Limited, Tokyo-to, Japan
Filed Dec. 3, 1970, Ser. No. 94,888
Claims priority, application Japan, Dec. 4, 1969, 44/97,728
Int. Cl. B27k *3/36;* B44d *1/28*
U.S. Cl. 117—148           9 Claims

ABSTRACT OF THE DISCLOSURE

At least one compound selected from ester compounds and polyalkylene glycol compounds (e.g., methylethyl glycolate) is added to and dissolved in a vinyl monomer, which is then used to impregnate a wood matrix and caused to polymerize by irradiation with $\beta$-rays from an electron-beam accelerator thereby to produce a wood-plastics composite structure free of cracks.

BACKGROUND OF THE INVENTION

This invention relates generally to wood-plastics composite structures and more particularly to a new and advanced process for producing wood-plastics structures whereby development of cracks in the resulting products is prevented.

The process of causing a vinyl monomer to impregnate voids in a wood matrix and applying polymerization conditions to this monomer within the wood matrix thereby to produce a product wherein the wood and the plastics consisting of the polymer formed are in an integral or composite state, that is, a wood-plastics compound structure or composite structure, is known.

A wood-plastics composite structure of this nature is an excellent material, retaining the desirable qualities of wood and, at the same time, being free of some of the disadvantages of wood. However, products fabricated from this material tend to develop cracks in many cases, and this tendency has heretofore been a serious problem in the production of this material.

It appears that the principal causes of this cracking are volumetric shrinkage occurring during the polymerization of the vinyl monomer and destruction of a part of the fine structure within the wood due to accumulation of polymerization heat. In order to find measures for solving this problem, various studies such as studies on various combinations of monomers, on conditions of impregnation of the wood by the monomer, and on the conditions of drying are being carried out. The results attained heretofore, however, have not been completely satisfactory.

For this reason, in the production of wood-plastics composite structures of relatively large size, a product loss as high as 20 percent frequently occurs.

SUMMARY OF THE INVENTION

It is an object of the present invention to provide a solution to the above described problem. More specifically an object of the invention is to provide a simple and economical process for producing wood-plastics composite structures whereby occurrence of cracks in the final products is prevented. Another object of the invention is to provide wood-plastics composite structures in which cracks do not occur.

We have found that the object of the invention can be achieved by dissolving in a vinyl monomer a substance exhibiting a plasticizing effect with respect to the polymer formed, impregnating a wood matrix structure with the resulting monomer, and causing the monomer within the wood to polymerize.

According to the present invention, briefly summarized, there is provided a process of the nature described above, in which a wood structure is impregnated with a vinyl monomer which is then subjected to polymerization conditions, which process is characterised in that at least one compound selected from ester compounds and polyalkylene glycol compounds is added to and caused to be dissolved in the vinyl monomer previous to its use for impregnating the wood material.

According to the present invention there is further provided and advanced wood-plastics composite structures which can be produced with almost no incidence of cracks therein.

The nature, principle, and utility of the invention will be more clearly apparent from the following detailed description beginning with a consideration of general aspects of the invention and concluding with specific examples of practice illustrating preferred embodiments of the invention.

BRIEF DESCRIPTION OF THE DRAWING

In the drawing, the single figure is a graphical representation indicating the variations with time of the temperatures at the central parts of wood samples in the case of the process according to the invention and in the case of a known process.

DETAILED DESCRIPTION

When a vinyl monomer in which a substance exhibiting the aforementioned plasticizing effect is in dissolved state is polymerized within the voids of a wood material, the following advantageous features are afforded in general.

(1) There is almost no volumetric shrinkage accompanying the polymerization, and, furthermore, excessive temperature rise within the wood material can be avoided.

(2) A drop in the polymerization velocity of a typical vinyl monomer such as methyl methacrylate and a lowering of the molecular weight of the resulting polymer cannot be observed in practice.

(3) Since the cohesive energy of the resulting polymer is low, the impact resistance of the polymer itself and, therefore, that of the resulting wood-plastic composite structure are improved.

(4) The production process can be easily practiced as an industrial process, the dissolving of the above mentioned additive being the only additional step.

While the reasons why the above stated features are afforded in relation to a polymer thus formed within a wood structure are not entirely clear, it may be presumed that the additive substance is interposed between the molecular chains of the polymer (it being conceivable that the additive undergoes solvation with the polar group of the polymer), and the net-like gel structure due to the molecular chains of the polymer is remarkably moderated or relaxed. Accordingly, the sliding or slipping between the molecular chains is improved, and, moreover, micro-Brownian motion of the molecular chains becomes possible.

Additive substances capable of affording such results may be broadly divided into ester compounds and polyalkylene glycol compounds.

(I) Ester compounds

In general, esters of dibasic to polybasic carboxylic acids and esters of dihydric to polyhydric alcohols, that is, diesters to tetraesters are suitable. The conditions for selection of the kind and molecular of these ester compounds are (1) that it be substantially soluble in the vinyl monomer used under the conditions of impregnation in the wood, (2) that it be a compound which will not excessively raise the viscosity of the solution formed, and (3) that it be a compound which is mutually soluble with the resulting polymer.

Examples of these ester compounds are aliphatic dibasic acid esters, phthalic acid esters, glycol esters, glycol acid esters, and pentaerythritol esters which can be represented by the following general formulas.

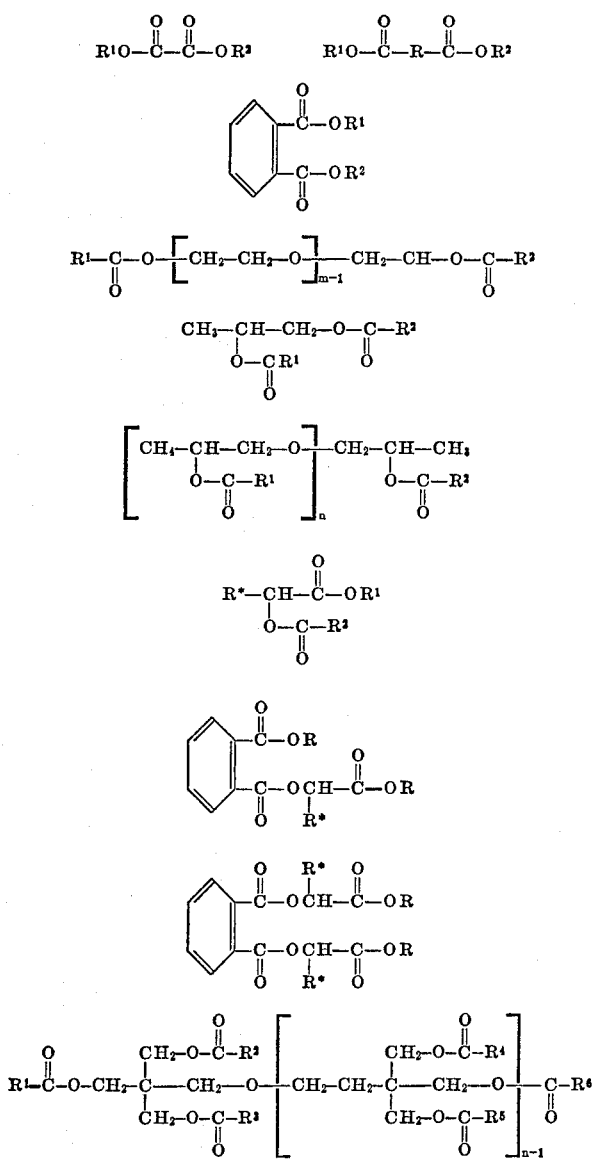

In the above formulas:

R is a straight-chain or branched-chain alkyl group;
$R^1$ through $R^6$ are the same or different alkyl, aralkyl, alkaryl, and cycloalkyl groups (preferably 20 carbon atoms or less);
$n$ is from 1 to 15;
$m$ is from 1 to 100; and
R* is hydrogen or an alkyl group.

In general, the molecular weight of the ester compound is of the order of at least 100. While the upper limit of the molecular weight is determined by the above considerations, it is generally of the order of 5,000.

Specific examples of these ester compounds are diethyl adipate, dioctyl adipate, dibutyl phthalate, dioctyl phthalate, diethylene glycol dinonanoate, triethylene glycol dinonanoate, propylene glycol dibutanoate, polyethylene glycol dinonanoate, and methylethyl glycolate.

(II) Polyalkylene glycol compounds

In the selection of the kind and molecular weight, the same criteria as those in the case of ester compounds are adhered to.

For the alkylene group, lower alkylene groups, particularly an ethylene group, are suitable. It is possible to change at least one part of the free glycol group to a functional derivative thereof as, for example, an ester. In general, the molecular weight is approximately 480 or higher. While the upper limit of the molecular weight is determined by the above stated considerations, it is of the order of 5,000, in general.

More specifically, polyethylene glycols representable by the following general formula are highly suitable.

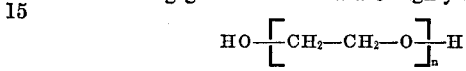

where $n=8$ to 100.

The quantity in which a specific agent for inhibiting cracking is used differs, depending on factors such as solubility and viscosity rise characteristic with respect to the monomer used and the desired degree of effect. In general, in the case of an ester compound, a quantity which is 20 percent by weight or less, particularly from 10 to 15 percent by weight, with respect to the quantity of the vinyl monomer is suitable in most cases. In the case of the polyalkylene glycol compound, a quantity which is 30 percent by weight or less, particularly from 15 to 20 percent by weight, with respect to the quantity of the vinyl monomer is suitable in most cases.

The above defined ester compounds and polyalkylene glycol compounds can be used as mixtures of two or more compounds in respective compound groups or as mixtures of two or more compounds from both compound groups.

Except for the feature wherein an additive substance as defined above is existing in dissolved state in the vinyl monomer with which the wood matrix is to be impregnated, the wood-plastics composite structure may be produced by any suitable technique which can be used for this kind of production.

Accordingly, for the "vinyl monomer," any ethylenically unsaturated compound which is capable of impregnating the voids in the wood material and, moreover, undergoing polymerization within these voids can be used. Specific examples of such compounds are alkenyl aromatic compounds, particularly styrene, nucleus and (or) side-chain-substituted styrenes such as α-methylstyrene, methacrylate esters, e.g., lower alkyl esters such as methyl methacrylate and lauryl methacrylate, acrylate esters, e.g., lower alkyl esters such as butyl acrylate, acrylonitrile and α-substituted acrylonitriles, e.g., methacrylonitrile, vinyl esters, vinyl halides, vinylidene halides, and mixtures of two or more of these vinyl monomer compounds.

The polymer formed from a vinyl monomer as defined above may be crosslinked. Accordingly, it may contain a small quantity of a suitable polyvinyl monomer such as divinylbenzene.

A wood-impregnating liquid comprising a vinyl monomer of the above described character may contain in dissolved state an auxiliary substance in accordance with necessity. Accordingly, in order to adjust the viscosity of the wood-impregnating liquid, it is possible to use a solvent as, for example, an alcohol or ether solvent. It is also possible to add the above described crack inhibitor in the form of a solution to the vinyl monomer. Furthermore, it is also possible to admix with the wood-impregnating liquid additives such as a stabilizer for the polymer to be formed, a lubricant, a coloring agent, and a combustion retarder.

For the wood matrix to be used in accordance with the invention, almost any kind of wood is suitable. While a piece of wood of almost any shape is suitable, the effectiveness and utility of this invention is particularly pronounced in the case of wood structures of large dimensions wherein the dissipation of internal heat is relatively difficult.

The impregnation of the wood structure with the impregnating liquid can be accomplished by the steps of reduction of the pressure (evacuation) of the impregnation atmosphere, impregnation, returning of the pressure to atmospheric pressure or applying a higher pressure.

While the polymerization conditions may be applied to the impregnated wood by heating and decomposing of a polymerization starting agent (e.g., a redox initiator previously added to the impregnating liquid, a preferable technique is irradiation of the impregnated wood structure with high-energy radiation. While any radiation rays usable for so-called radiation polymerization may be used for this irradiation, gamma-rays obtained from isotopes such as cobalt 60 and beta-rays obtained from an electron-beam accelerator are convenient.

Furthermore, by adding a compound having a catalytic action such as azobisisobutyronitrile (AIBN), it is also possible to reduce the quantity of irradiation with radiation rays. Under irradiation with radiation rays, there is a great possibility of graft-bonding of the polymer and wood.

In order to indicate still more fully the nature and utility of the invention, the following specific examples of practice constituting preferred embodiments of the invention and results are set forth, it being understood that these examples are presented as illustrative, and that they are not intended to limit the scope of the invention.

EXAMPLE 1

The moisture content of sample pieces of beech wood (Fagus Sieboldi) was adjusted to approximately 15 percent, and the sample wood pieces were placed on a reaction vessel, which was then evacuated to extract air contained in the voids in the wood. An impregnating liquid prepared by adding 0.1 percent AIBN to a mixture liquid of styrene and methyl methacrylate (mixture ratio of 1:1) and further adding a specific quantity of a cracking inhibitor was introduced into the wood pieces.

A quantity of the impregnating liquid corresponding to a theoretical impregnation of the order of approximately 70 percent impregnated the voids in the wood pieces. The wood pieces thus impregnated were left standing for a number of minutes to permit the impregnating liquid to flow and diffuse throughout the wood material. Excess treatment liquid was then driven off by means of $N_2$ gas, and then the interior of the reaction vessel was filled with $N_2$ gas to a pressure of 4 kg./cm.$^2$. When the interior temperature of the reaction vessel was raised to 75° C., gradual polymerization began. After 6 hours of this step, the temperature was raised further to 85° C. and the polymerization was continued for 1 hour at this temperature, whereupon sample products were obtained.

The above described procedure was carried out with various additives in different quantities.

For reference, the same procedure was carried out except that a cracking inhibitor was not added.

Th particulars of this procedure and results are set forth in the accompanying table.

The variation with time of the temperature at the center of the wood sample used in Experiment No. 18 in the table was measured and found to be as indicated by curve 1 in the graph and the accompanying drawing. Curve 2 in the same graph indicates this variation in the case of a sample produced by a conventional process without addition of the additives according to this invention.

| Experiment number | Additive Kind | Quantity added (percent) | Reaction rate (percent) | Crackless state (product yield) (percent) | Impact strength (kg.cm./cm.$^2$) | Outer appearance |
|---|---|---|---|---|---|---|
| 1 | | | 100 | 70 | 118 | Excellent. |
| 2 | Diethyl adipate | 1 | 100 | 75 | 120 | Do. |
| 3 | do | 5 | 100 | 95 | 128 | Do. |
| 4 | do | 15 | 100 | 100 | 133 | Do. |
| 5 | do | 20 | 99 | 100 | 143 | Slight discoloration. |
| 6 | do | 25 | 95 | 100 | 130 | Much discoloration. |
| 7 | Dioctyl phthalate | 5 | 100 | 95 | 122 | Excellent. |
| 8 | do | 15 | 100 | 100 | 125 | Do. |
| 9 | do | 20 | 98 | 100 | 127 | Slight discoloration. |
| 10 | Diethylene glycol dinonanoate | 5 | 100 | 98 | 123 | Excellent. |
| 11 | do | 15 | 100 | 100 | 123 | Do. |
| 12 | do | 20 | 99 | | | Do. |
| 13 | Methylethyl glycolate | 5 | 100 | 100 | 128 | Do. |
| 14 | do | 15 | 100 | 100 | 128 | Do. |
| 15 | do | 20 | 98 | 100 | 135 | Slight discoloration. |
| 16 | Polyethylene glycol (mol. wt. 600) | 1 | 100 | 75 | 115 | Excellent. |
| 17 | do | 10 | 100 | 90 | 121 | Do. |
| 18 | do | 20 | 100 | 100 | 130 | Do. |
| 19 | do | 30 | 100 | 100 | 132 | Do. |
| 20 | do | 45 | 99 | 100 | 135 | Slight discoloration. |
| 21 | do | 50 | 95 | 100 | 108 | Much discoloration. |

NOTE.—Crackless state (product yield) is the percentage of samples without cracks within from 10 to 30 samples produced; Impact strength was measured in accordance with Japan Industrial Standards JIS Z2116–1963, "Method for impact bending testing of woods."

EXAMPLE 2

Generally in accordance with the procedure of Example 1, impregnating liquids with and without the addition of 15 percent of dioctyl phthalate were prepared and used to impregnate respective wood structures, which were then taken out of the reaction vessel, placed in polyethylene bags, and transported into an irradiation chamber.

As the interior temperature of the irradiation chamber was adjusted so as to maintain the impregnated wood samples continually at approximately 40° C., the samples on a conveyer were subjected to irradiation at a dose rate of $2 \times 10^{-4}$ rads/hour for a time period such that the total dose was 0.3 megarad, whereupon wood-plastics composite products were obtained.

Among the 30 samples prepared and tested in this comparative experiment, 8 samples without additives exhibited cracks, while only one sample with dioctyl phthalate as an additive was found to have cracks.

EXAMPLE 3

The moisture content of 8 sample pieces of persimmon wood for use as shuttle material was adjusted to approximately 14 percent. The wood pieces were then placed in a reaction vessel, which was evacuated to extract air contained in the voids of the wood pieces.

An impregnating liquid was prepared by mixing and thoroughly agitating together 75 parts of a mixture (1:1) of styrene and methyl methacrylate, 2 parts of divinylbenzene, 18 parts of a polyethylene glycol of a molecular weight of 400, and 5 parts of dibutyl phthalate and adding to the resulting mixture AIBN in a quantity of 0.7 percent of the total liquid quantity.

When this impregnating liquid was introduced into the wood pieces, a quantity of the liquid equal to approximately 50 percent of the theoretical impregnation quantity infiltrated into the voids in the wood. The wood pieces thus impregnated were left standing for a number of minutes to permit the impregnating liquid to flow and diffuse fully into the wood, and then surplus liquid was removed through the use of nitrogen gas. The reaction vessel was then further charged with nitrogen gas to an interior pressure of 4 kg./cm.$^2$, and hot air was supplied thereinto to raise the vessel interior temperature to 75° C., whereupon the impregnating liquid within the wood pieces began to undergo gradual polymerization.

The time for the temperature at the interior centers of the wood pieces to reach approximately 88° C. was 45 hours, and the polymerization was completed, exhibiting this peak temperature. Immediately thereafter, the interior temperature of the reaction vessel was raised to 85° C. and thus maintained for 1 hour. All sources of heat were then cut off, and the vessel interior was cooled.

When the wood pieces were taken out of the vessel, they were found to be shuttle material with an elongation of approximately 3 percent relative to the original dimension (in the grain direction) in which the polymerization was fully completed. None of the 8 samples exhibited cracks.

EXAMPLE 4

The moisture content of 5 sample pieces of French walnut wood for rifle stocks was adjusted to approximately 14 percent. The wood pieces were then placed in an impregnation vessel, which was then evacuated to extract air contained in the voids in the wood pieces.

An impregnating liquid was prepared by mixing and thoroughly agitating together 70 parts of methyl methacrylate, 2 parts of divinylbenzene, 20 parts of a solution of a polyethylene glycol of a molecular weight of 2,000 in an equal quantity of dioxane, 9 parts of adipic acid ester, 0.8 part of dibutyl tin laurate, and 0.2 part of petroleum wax and adding to the resulting mixture AIBN in a quantity of 0.6 percent of the total liquid quantity.

The impregnating liquid thus prepared was introduced into the sample wood pieces, which were left standing so as to permit approximately 55 percent of the theoretical impregnation rate of the liquid to flow and diffuse thoroughly throughout the wood pieces. Surplus impregnating liquid was removed, and the wood pieces thus impregnated were placed in polyethylene bags having thick walls, which were transported into an irradiation chamber.

In the irradiation chamber, the impregnated wood pieces were irradiated at room temperature with 5 megarads of β-rays from an electron-beam accelerator of a rating of 4 Mev./0.7 kw. thereby to cause polymerization of the monomer. The samples were then taken out of the irradiation chamber and left for approximately 1 hour in a heat-treatment chamber at 85 degrees C. to drive off dioxane from the interior of the samples.

As a result, it was found that the polymerization had been fully completed, and the samples were found to have been elongated approximately 2.5 percent relative to the original dimension (in the grain direction) and to exhibit properties suitable for the use of the material for rifle stocks. None of the 5 samples showed cracks.

We claim:
1. In the production of wood-plastics composite structures by impregnating a wood structure with a vinyl monomer and applying polymerization conditions to this impregnated monomer, the improvement which comprises adding to said vinyl monomer, previous to its use for impregnating the wood structure, at least one compound which is soluble in said vinyl monomer and free of ethylenic unsaturation capable of polymerizing with said vinyl monomer selected from the group consisting of ester compounds having a molecular weight of at least 100 and polyalkylene glycol compounds having a molecular weight of at least 480, said compound being retained within said wood structure.

2. The process according to claim 1 in which said ester compounds are aliphatic dibasic acid esters, phthalic acid esters, glycol esters, glycol acid esters and pentaerythritol esters which can be represented by one of the formulas:

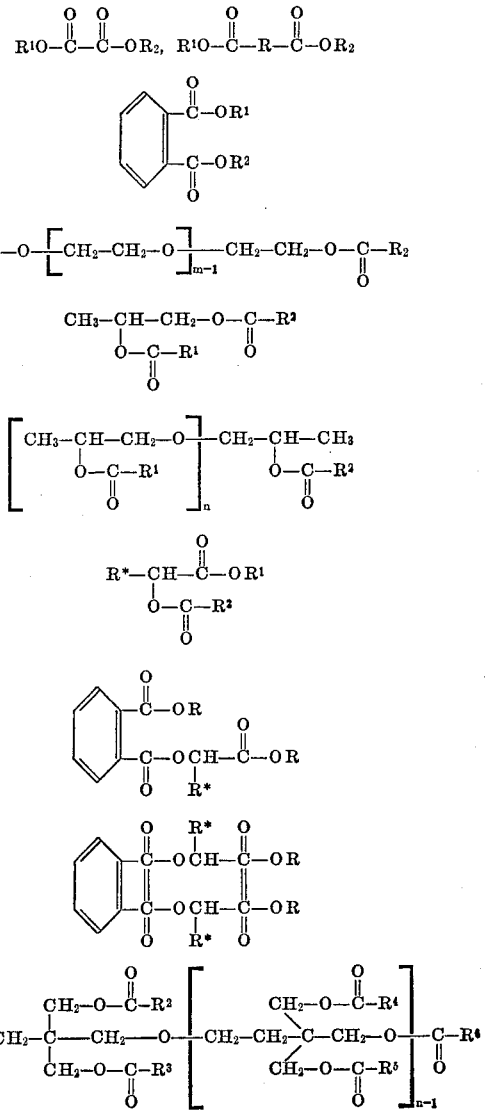

where:
R is a straight-chain or side-chain alkyl group;
R$^1$ through R$^6$ are the same or different alkyl, aralkyl, alkaryl, and cycloalkyl groups;
n is from 1 to 15;
m is from 1 to 100; and
R* is hydrogen or an alkyl group,
and said polyalkylene glycol compounds are polyethylene glycols representable by the general formula

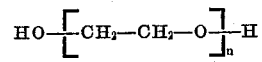

where n is from 8 to 100.

3. The process according to claim 2 in which said vinyl monomer is an ethylenically unsaturated compound selected from the group consisting of alkenyl aromatic compounds, methacrylate esters, acrylate esters, acrylonitrile, alpha-substituted acrylonitriles, vinyl esters, vinyl halides, vinylidene halides, and mixtures of at least two thereof.

4. A process according to claim 1 in which said ester compound is added to said vinyl monomer in an amount of about 10 to 15 percent by weight based on the vinyl monomer.

5. A process according to claim 1 in which said polyalkylene glycol compound is added to said vinyl compound in an amount of about 15 to 20 percent by weight based on the vinyl monomer.

6. A process according to claim 2 in which said $R^1$ through $R^6$ are the same or different alkyl, aralkyl, alkaryl and cycloalkyl groups wherein each of said groups contains up to 20 carbon atoms.

7. A wood-plastics composite structure comprising a wood matrix and a polymer containing a crack inhibitor filling voids within said matrix and bonded strongly and integrally with the matrix, said polymer being disposed and formed within the wood matrix by the process of impregnating the wood matrix in a natural state with an impregnating liquid comprising a vinyl monomer and a crack inhibiting additive dissolved in said vinyl monomer said crack inhibiting additive being soluble in said vinyl monomer, free of ethylenic unsaturation and selected from at least one member of the group consisting of ester compounds having a molecular weight of at least 100 and polyalkylene glycol compounds having a molecular weight of at least 480 and applying polymerization conditions to the vinyl monomer in said impregnating liquid thus impregnating the wood matrix.

8. A wood-plastics composite structure according to claim 7 in which said polymer contains said polyalkylene glycol in an amount of about 1 to 50 percent by weight.

9. A wood-plastic composite according to claim 7 in which said polymer contains said ester compound in an amount of about 1 to 25 percent by weight.

References Cited

UNITED STATES PATENTS

| | | | |
|---|---|---|---|
| 3,044,978 | 7/1962 | Hagele et al. | 117—148 |
| 2,629,674 | 2/1953 | Ericks | 117—148 |
| 2,984,643 | 5/1961 | Nischk et al. | 117—148 |
| 3,083,118 | 5/1966 | Bridgeford | 117—148 |
| 3,077,417 | 2/1963 | Kenaga | 117—158 |
| 2,655,454 | 10/1953 | Farber | 117—148 |
| 3,008,914 | 11/1961 | Fry | 117—148 |
| 2,982,682 | 5/1961 | Matlin et al. | 117—140 A |

WILLIAM D. MARTIN, Primary Examiner

W. R. TRENOR, Assistant Examiner

U.S. Cl. X.R.

117—59, 161 K, DIG. 3